_United States Patent_ [19]

Kantor

[11] 4,330,169

[45] May 18, 1982

[54] DEVICE AND METHOD FOR AIDING VISION

[76] Inventor: Frederick W. Kantor, 523 W. 112th St., New York, N.Y. 10025

[21] Appl. No.: 73,273

[22] Filed: Sep. 7, 1979

Related U.S. Application Data

[63] Continuation-in-part of Ser. No. 959,445, Nov. 13, 1978, abandoned, which is a continuation of Ser. No. 816,819, Jul. 18, 1977, abandoned, which is a continuation of Ser. No. 580,351, May 23, 1975, abandoned, which is a continuation of Ser. No. 249,537, May 2, 1972, abandoned.

[51] Int. Cl.³ .................... G02B 5/17; G02B 23/00; G02C 7/02

[52] U.S. Cl. .................... 350/9; 350/96.26; 351/159

[58] Field of Search .............. 350/96.26, 96.25, 188, 350/431, 9; 351/159; 128/4

[56] References Cited

U.S. PATENT DOCUMENTS

| | | | |
|---|---|---|---|
| 3,010,357 | 11/1961 | Hirschowitz | 350/96.26 |
| 3,202,046 | 8/1965 | Roos | 351/159 |
| 3,430,057 | 2/1969 | Genahr | 250/227 |
| 3,526,748 | 9/1970 | Rienks | 350/96.25 |
| 3,655,259 | 4/1972 | Miyauchi et al. | 350/36 |
| 3,664,330 | 5/1972 | Deutsch | 128/18 |
| 3,680,948 | 8/1972 | Sussman et al. | 350/96.25 |
| 3,748,016 | 7/1973 | Rossire | 350/96.25 |
| 4,015,115 | 3/1977 | Cocoran | 250/199 |
| 4,045,133 | 6/1975 | Carlson | 355/1 |

FOREIGN PATENT DOCUMENTS 1942971 2/1970 Fed. Rep. of Germany .
2447040 4/1976 Fed. Rep. of Germany .
448015 10/1974 U.S.S.R. .

OTHER PUBLICATIONS

Jacobs, Donald W.; _Fundamentals of Optical Engineering;_ McGraw-Hill Book Co., Inc,; New York; 1943; pp. 184–187.
"The Major Eye Disorder No One Understands", Newsday, Oct. 31, 1977.
"Eye Disorder Makes Life Hard to Handle", p. 2-G, The Miami Herald, Aug. 29, 1979.
IBM Technical Disclosure Bulletin, "Fiber Optic Magnifier", vol. 9, No. 12, May, 1967.
IBM Technical Disclosure Bulletin, "Coherent Fiber Optic Nine-Light Pipe Microscope", vol. 15, No. 8, Jan. 1973.

_Primary Examiner_—John K. Corbin
_Assistant Examiner_—Scott J. Sugarman
_Attorney, Agent, or Firm_—Curtis, Morris & Safford

[57] ABSTRACT

A microscope with a flexible fiber-optic bundle used as a scanner is provided to assist the vision of people; particularly to enable persons with vision defects to read. The eyepiece of the microscope spreads the enlarged images onto the functional portion of the retina of the user. A lenticular screen is used as a diffuser in the microscope. The person moves one end of the fiber-optic bundle along the material to be viewed in order to scan it. The flexibility of the fiber-optic bundle facilitates the scanning motion. The character images are broken up into small segments by the fibers. In each segment the light intensity is substantially the average of the light received by that fiber of the bundle. Thus, confusing background details of the paper, etc., on which the matter is written, are substantially subdued or eliminated.

12 Claims, 7 Drawing Figures

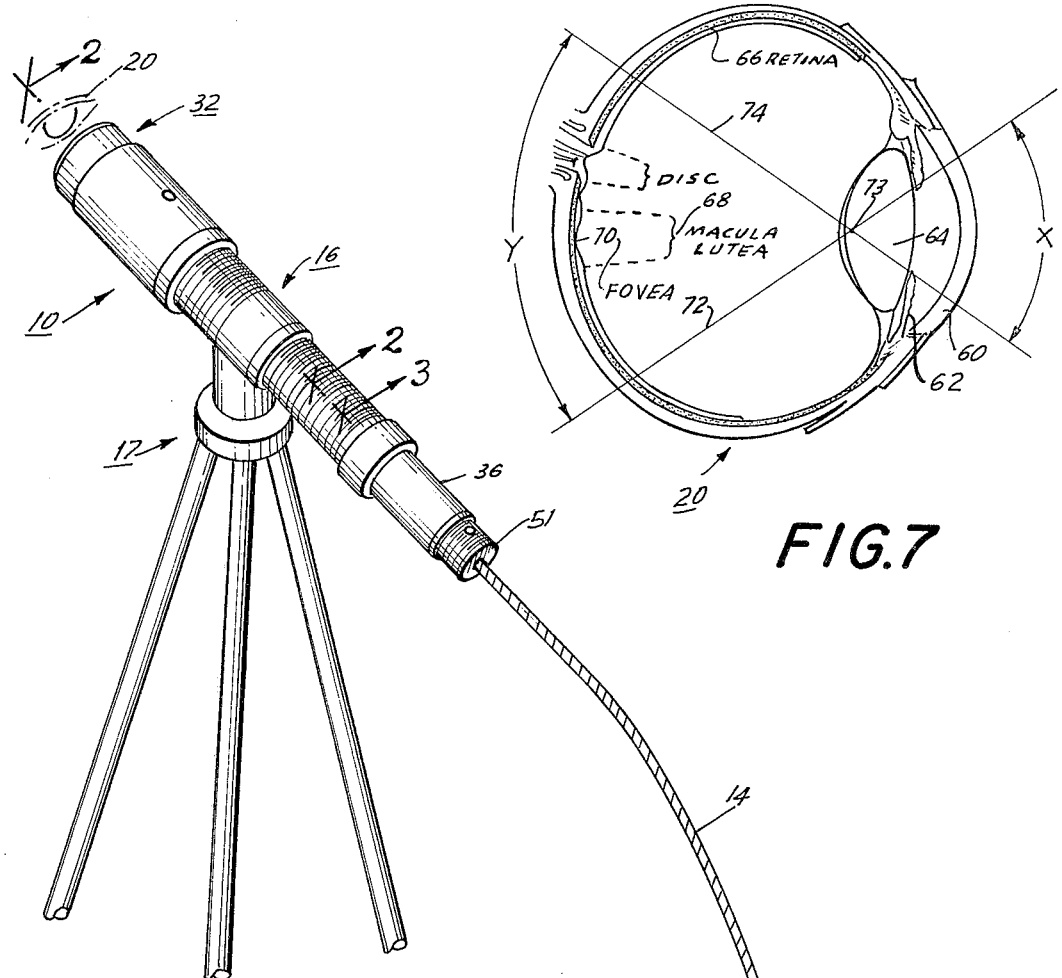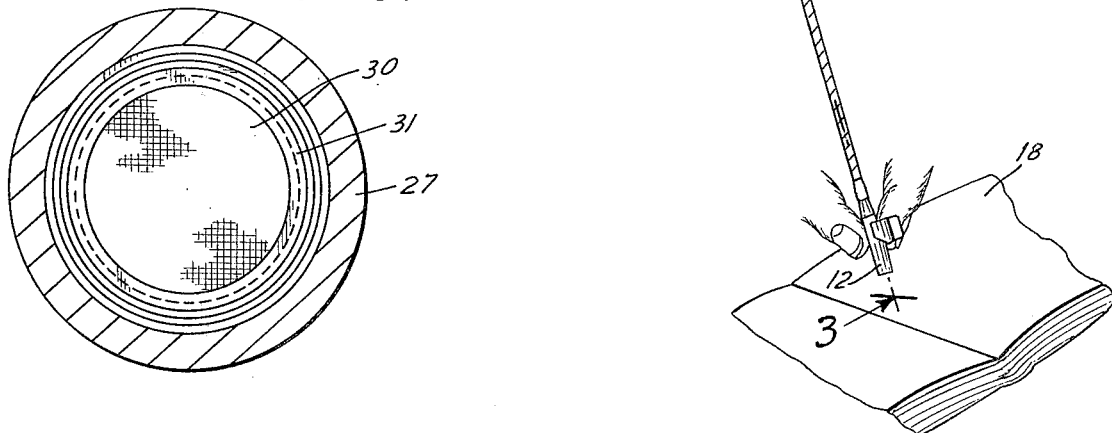

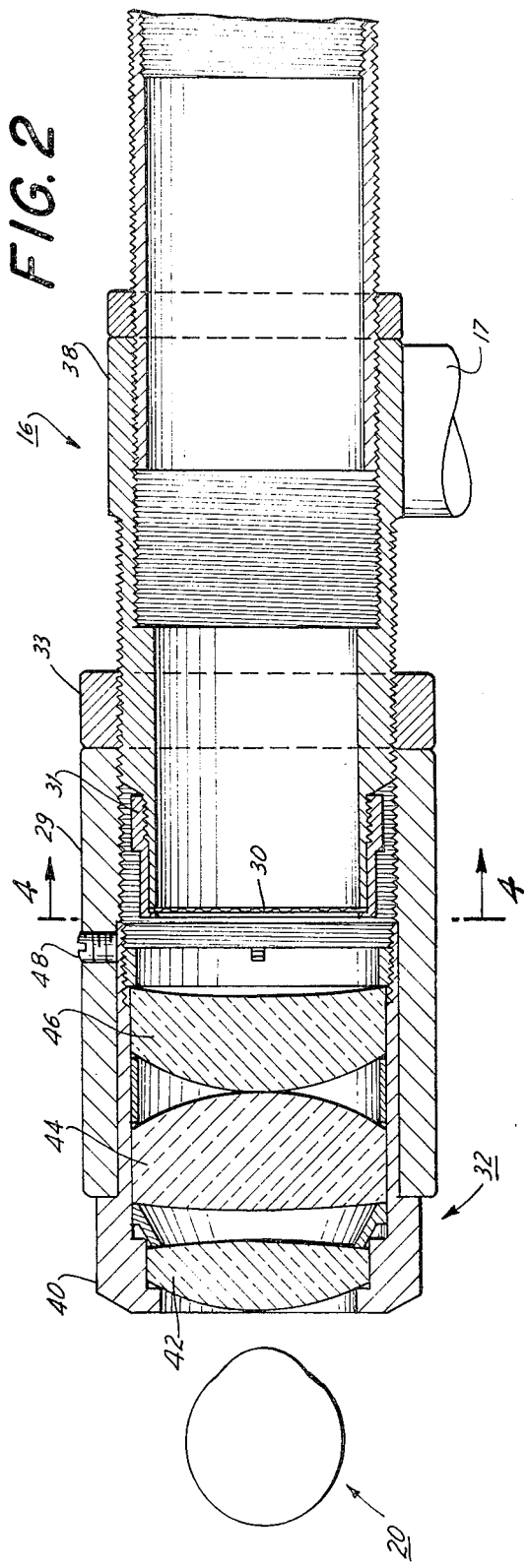
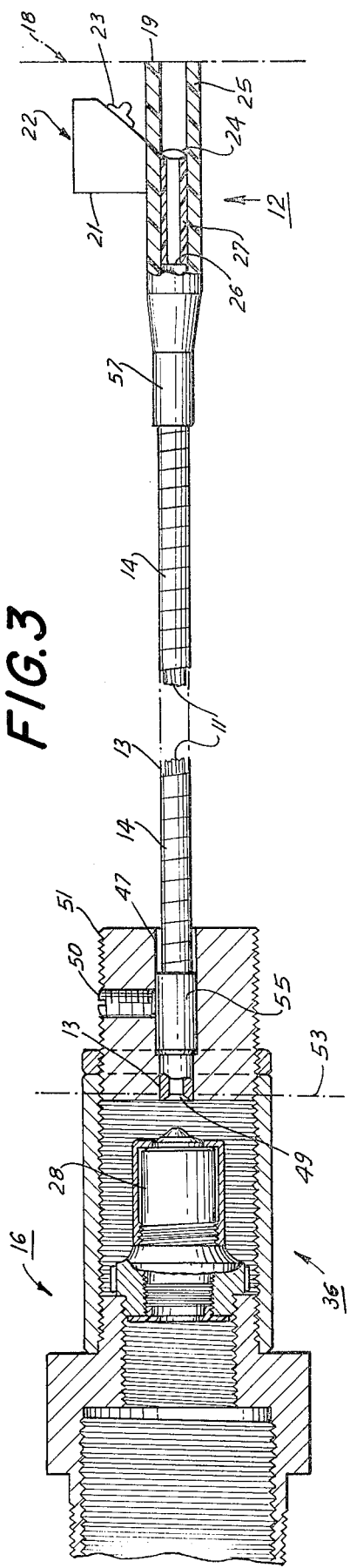

DEVICE AND METHOD FOR AIDING VISION

This patent application is a continuation-in-part of U.S. patent application Ser. No. 959,445, filed Nov. 13, 1978, now abandoned, which is a continuation of U.S. patent application Ser. No 816,819, filed July 18, 1977, now abandoned, which is a continuation of U.S. patent application Ser. No. 580,351, filed May 23, 1975, now abandoned, which is a continuation of U.S. patent application Ser. No. 249,537, filed May 2, 1972, now abandoned.

This invention relates to a device and method for aiding human vision; particularly for aiding the vision of persons having inoperative or defective vision due to macular degeneration, cataracts and/or other defects which make the retina of the eye partially inoperative. The disclosures of those applications hereby are incorporated herein by reference. For further details, see: "INFORMATION MECHANICS", by Frederick W. Kantor, Wiley, N.Y., 1977.

Disorders or defects which can cause part of the retina to be inoperative or ineffective include macular degeneration, cataracts, corneal scarring, intra-ocular light scattering, retinal damage, neurological damage, and aphakia, etc.

The foregoing defects occur in persons of all ages. However, the majority are found in older persons. Such defects often seriously impair or destroy the ability of the person to read. This creates an especially unfortunate result for many individuals to whom reading is vital in their work, such as doctors, scientists, attorneys, clergy, etc. Many such people are disabled midway or late in their careers, when their many years of experience makes them more valuable to society than before. Even for people to whom reading is not essential for their livelihood, the loss of the ability to read often degrades the quality of life.

One of the principal causes of loss of central vision is "macular degeneration". This is the degeneration of the fovea and other areas within the central portion of the retina called the macula lutea, or simply the "macula". It is the area within the macula, and primarily the fovea, which is used for reading. This area contains a relatively high concentration of sensors, and provides vision with the resolution usually required for ordinary reading. This area has a resolution which is substantially greater than that of more remote areas of the retina.

When the eye does not have the resolution required for normal reading, whether through macular degeneration, cataracts, trauma, hereditary and/or other causes, often lower resolution vision, such as from the peripheral portion of the retina, is functional. However, such lower resolution, for example, that provided by the concentration of sensors in the peripheral retina, usually is not great enough to permit the person to read without some type of visual aid.

Various visual aids for defective vision of the types discussed above have been proposed and used in the past. Such aids include hand-held or stationary magnifiers and telescopic glasses, as well as special television cameras and receivers which enlarge, brighten, and change the contrast of the printed characters. It is believed that these prior devices have had only limited success, and that they are relatively costly, cumbersome, inconvenient to use and/or complex.

One of the prime objects of this invention is to provide a device and method for enabling people to read despite defective visual resolution. It is another object to provide such a device and method in which color is substantially transmitted.

Another object of the invention is to provide a device and method for improving the use of the peripheral vision of human beings.

A further object of the invention is to provide such a device and method which are relatively simple, easy to use, and easy to learn to use, and a device which is relatively compact, light-weight, and inexpensive to manufacture.

Images of small objects (e.g., characters) usually must be enlarged to make them discernable by the peripheral portion of the retina. Such enlargement of the images also enlarges fibers and other background details on the paper on which the images are printed to such a degree that they may be distracting and disturbing to the user.

Accordingly, it is another object of the invention to provide a visual aid device and method which greatly enlarge the images to be read while reducing the detrimental visual effects of such background details on the user.

The foregoing objects are met, in accordance with the invention, by the provision of a visual aid device and method in which characters and/or other objects to be read and/or viewed are scanned, and/or examined, by means of a flexible light conduit which delivers images of the objects to a microscope. The microscope greatly enlarges the images and delivers the greatly enlarged images to the eye.

Preferably, the images are spread over a portion of the retina sufficiently large so that the defective area of the retina will be so small, relative to that of the entire area covered by the images, that the user will not recognize that defective area as a "blind spot" in his or her vision. In a specific embodiment of the invention, this is accomplished by use of a wide-angle lens as an eyepiece for the microscope.

Preferably, the light conduit is a fiber-optic bundle which is flexible and can be moved easily along a page to scan the printed matter. One end of the bundle is fixed to one end of the microscope and delivers an image of the characters to the desired object plane of the microscope.

Preferably, a scanning device, or "head", is provided at the other end of the fiber-optic bundle. The scanning device may include a lens or lens system to reduce the size of the image or images to fit them into a bundle of relatively small size, or to enlarge the image or images, as desired. The scanning device can include a lamp to illuminate the material being scanned.

A microscope typically has a relatively small depth of field and field of view, which would make it difficult to use alone in scanning the written matter. To alleviate this problem, the lens system of the scanning device can have a relatively large depth of field. This reduces the accuracy with which the scanning device must be positioned relative to the material being scanned, thus making the device easier to use. The fiber-optic bundle and scanning device are relatively light-weight and easy to move. The scanning motion of the fiber-optic bundle and scanning device is like those used to underline or cross out words, or move a finger along and below the text being read, and thus is familiar to many people and relatively easy to learn.

The fiber-optic bundle is used, in effect, to decompose the characters being read into an array of small segments, in each of which the light it receives is "averaged" so that the light transmitted is substantially free of input spatial intensity variations across the cross-section of each fiber. By this means, background details are substantially reduced or subdued, so that the images seen by the patient seem to be nearly the same as those seen by the normal eye.

The foregoing and other objects and advantages of the invention will be pointed out in, or apparent from, the following description and drawings.

In the drawings:

FIG. 1 is a perspective view of one embodiment of the invention;

FIG. 2 is a cross-sectional view, partially schematic, of the device shown in FIG. 1, taken along line 2—2 of FIG. 1;

FIG. 3 is a cross-sectional view of the device shown in FIG. 1, taken along line 3—3 of FIG. 1;

FIG. 4 is a cross-sectional view taken along line 4—4 of FIG. 2;

FIG. 7 is a cross-sectional schematic view of a human eye with markings thereon to illustrate certain features of the invention.

GENERAL DESCRIPTION

Figure 5:
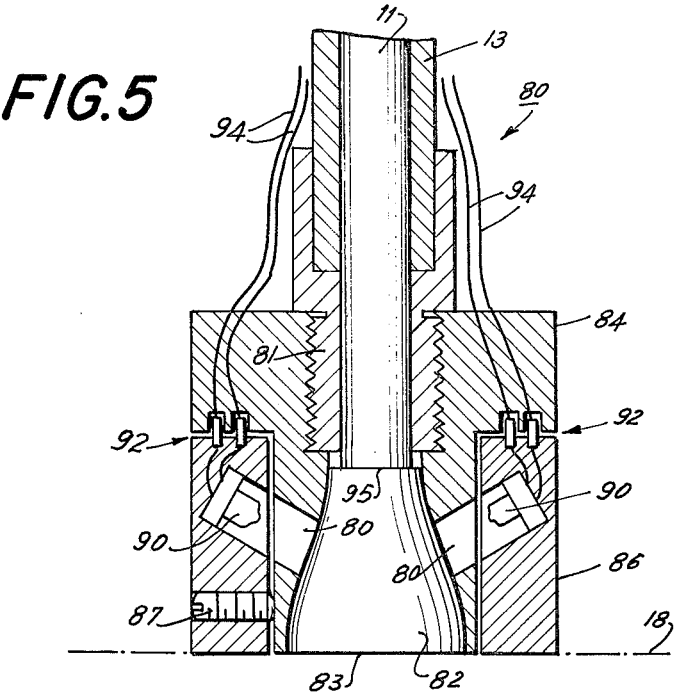
FIGS. 5 and 6 are cross-sectional views illustrating two alternative embodiments of the invention.

The visual aid device 10 depicted in FIG. 1 includes a reading or scanning head 12, a flexible fiber-optic cable 14, and a microscope 16 supported on a tripod stand 17. The reading head 12 is scanned over a page 18 of printed text such as that contained in a book. The images of the printed characters are delivered to a human eye at 20.

Referring now to FIGS. 2 and 3, the scanning head 12, shown in the lower right hand corner of FIG. 3, includes a lamp 22 which illuminates the characters written on the page 18, and a focusing lens 24 which focuses images of the characters on the end 26 of the fiber-optic cable 14. The other end 49 of the cable 14 is secured by means of a set-screw 50 in end-part 51 of a housing 36 in which is located an objective lens 28 forming a part of the microscope 16. The objective lens enlarges the images it receives from the cable 14 rather substantially (e.g., by a factor of 13), and delivers the enlarged images through a housing 38 to a screen 30 which acts as a diffuser. The images then are further enlarged (e.g., by a factor of 10) by an eyepiece lens 32, and are delivered to the eye 20.

SCANNING HEAD

The scanning head 12 includes a tubular housing 25 made of transparent material, and a lens barrel 27 mounted in the housing 25. The lens 24 is mounted by means of the lens barrel 27.

The lamp 22 includes a mounting structure 21 and a self-focusing light bulb 23 mounted in the structure 21 and aimed so as to direct its light through the transparent wall of the housing 25 toward the written matter within the confines of the end 19 of the housing 25 which contacts the page 18. The lamp is energized by batteries (not shown), by wires (not shown) connected to a standard household alternating current supply, and/or by other known power supplies.

The type of lamp 22 used is not critical. It can be incandescent, fluorescent, or a light-emitting diode, for example. In fact, if the ambient light is sufficiently strong, the lamp 22 is unnecessary.

It is advantageous to keep the diameter of the cable 14 relatively small. This helps in keeping the cable flexible, easy to use, and of moderate cost. However, it also is desired that the scanning head 12 be able to receive and transmit at least four or five adjacent characters of standard newspaper size (e.g., 6-point characters). This is approximately the same number of characters as normally can be recognized simultaneously with the human eye located at one position. Thus, the motion of the scanning head 12 can be made to approximately resemble normal eye movement more easily.

In order to achieve both the foregoing objects, the lens 24 preferably reduces the size of the character images in order to fit four or five characters into the confines of the cable cross-section. In a device which has been built and successfully tested, the character images were reduced by about 3 to 1. Of course, if greater magnification is desired, at the sacrifice of scope of coverage, then the lens can produce no reduction, or it can, if desired, magnify the images.

The person using the scanner 12 preferably keeps the end 19 of the housing 25 flush against the page 18 with its axis perpendicular to the page, so as to keep the characters sufficiently well focused. However, the lens 24 preferably has a sufficient depth of field so that the characters will remain in focus even when the end 19 is not flush against the page 18, or the scanning head is not perpendicular to the page 18. This is highly advantageous, in that it makes scanning much easier than it would be if only a small depth of field were available.

It should be noted that, in FIG. 1, for the purposes of clarity in the drawings, the scanning head is not shown in the perpendicular reading position.

FIBER-OPTIC BUNDLE

The fiber-optic bundle 14 is of the type which transmits images with fidelity appropriate for reading---sometimes referred to as a "coherent" image conduit. Such a conduit also, similarly, transmits color information.

The fiber-optic bundle 14 is either substantially circular or substantially polygonal in cross-section. A device built and successfully tested used a bundle containing about 4,000 hexagonal fibers within a diameter of about one-tenth of an inch (two and one-half millimeters). Each of the fibers has the property that it reflects or refracts the light it receives back and forth internally as the light moves along, and in so doing "averages" the light it receives. The light leaving the output end of each fiber is composed substantially of the combined light entering different portions of the inlet end of the fiber.

For cables 14 of no more than few meters length, it is preferred that the light distribution across the output end of each fiber be substantially uniform. Cables having such characteristics are commercially available. However, if the light distribution across the output end of each fiber is not substantially uniform, various choices of position of the end face 49 of the fiber bundle 11 in relation to the objective lens of the microscope can be used to accommodate various distributions of light output across the output diameter of that fiber.

The cable 14 consists of a bundle of fibers 11 enclosed by a flexible wound-metal protective sheath 13, with end ferrules 55 and 57.

The outlet end of the cable is fastened to one end part 51 of the microscope 16 by means of a set-screw 50 which holds the ferrule 55 tightly in a hole 47 in the end-part 51. The face 49 of the fiber-optic bundle 11 is positioned at a selected objective plane 53, and is held securely in place by the set-screw 50.

One of the advantages of the invention is that the upper end of the fiber bundle 11 can be firmly fixed at the desired object plane and left there. Scanning involves moving the lower end 26 of the fiber bundle 11 and the scanning head 12. The scanning head 12 has a relatively large depth of field and is relatively easy to use in scanning, whereas the microscope 16 ordinarily has a relative small depth of field and would be more difficult to use in scanning.

MICROSCOPE

The microscope 16 includes a threaded barrel 38 (FIG. 2) which can be used to adjust the distance between the screen 30 and the objective lens 28 in order to change the magnification of the microscope.

In a device which has been built and successfully tested, the screen 30 is a commercially-available lenticular screen made of a plastic material containing many tiny lenses. This screen diffuses the images and allows the eye of the user to shift somewhat without losing focus, thus making the device easier to use. Other diffusers can be used instead, if desired.

The screen 30 is held in place by means of a threaded retainer ring 31 (also see FIG. 4) which is threaded onto one end of a barrel 38. A sleeve 29 is threaded onto the outside of barrel 38, and is held in place by a threaded retainer ring 33.

The eyepiece 32 of the microscope preferably is a wide-angle lens such as an "Erfle" eyepiece (for example, as sold by Edmund Scientific Co., Barrington, N.J.), having an effective focal length of about 32 millimeters and an angle of field of about 68°.

The lens 32 consists of a housing 40, which fits inside of the sleeve 29, and three lens elements 42, 44 and 46. The housing is held in place by means of a set-screw 48.

DISPLAY ON THE RETINA

The outline of a human eye 20 is depicted in FIG. 2 in its approximate location when using the visual aid device 10. FIG. 7 shows the eye 20 enlarged and in cross-section.

The eye includes the cornea 60, the iris 62, the lens 64, the retina 66, the macula lutea 68, and the fovea 70. Two lines 72 and 74 are drawn through the approximate nodal point 73 of the eye 20 in FIG. 7. The lines 72 and 74 are separated from one another by angle X, which is the angle of field of the eyepiece lens 32 (about 68° here).

The region of the retina over which the images from the eyepiece 32 are spread is indicated by the letter Y. This area is determined primarily by the angle X; that is, the wider the angle of the eyepiece lens 32, the greater the retinal area over which the images are spread.

It can be seen that the images are spread over a substantial area of the retina beyond the macula. Thus, if only the macula is inoperative, the inoperative area is small relative to the area upon which the images are spread, and it is believed that the user does not usually notice that inoperative region as a "hole" or discontinuity in his or her vision.

The character images reaching the retina are greatly enlarged. The microscope 16 is capable of enlarging the images it receives by a factor of from about 100 to 150. This means that the total enlargement of the images thus is from around 30 to 300 or more, depending upon the patient and the number of characters to be seen at a given position of the scanning head 12.

The amount of enlargement used can be selected by testing the person's vision and finding approximately the minimum (angular) size of objects which are distinguishable by the person, and then setting the enlargement so as to produce character images slightly larger than that.

Sometimes it is useful to slightly displace the object plane 53 of the objective lens 28 axially, in order to improve the contrast or quality of the images sensed by the user, for example, to delete the borders between fibers in the fiber bundle 14 from the user's view. However, people with central vision defects often cannot see those borders as borders.

It is believed that, when the viewer uses the device, his or her sense of perception usually does not seem to fluctuate in that area of the retina being used. This approximates the experience of the person, and often seems to make him or her feel as if he or she is reading substantially normally.

OPERATION

Information may be represented on page 18 in the form of regions with various effects on incident light. For example, the character "E" may be regarded as composed of regions of relatively high or low light scattering, corresponding respectively to the relatively bright or dark parts of the character. Usually, the eye of a person with normal vision reading an "E" in 6 point type (about 2.1 m.m. or 1/12 inch), with an eye to page distance of about 45 cm. (about 17.7 inches), would form an (inverted) image of that E having an angular width or height of about 0.27°. Typically, about 4 or 5 adjacent such characters can be recognized together by a person with "normal" vision, subtending together a total angle of about 1.35°. If a person who is not myopic has lost the use of that central part of his or her retina, then he or she is usually not able to read such print in the usual unaided way. For a person who does not have use of those portions of his or her retina which provide angular resolution usually needed for reading, the visual information normally derived from sizes and shapes of markings on the page (18), which information provides to the user's central nervous system information from which the characters may be recognized, is in that way not readily accessible to the reader.

Such absence of angular resolution results in an abnormal transformation of the representation of information conveyed through the defective eye and into the person's brain. This invention is believed to provide apparatus and method for transforming the representation of information received from the page, and delivering information to a defective eye, so that the combined transformation of representation of information, by both this apparatus and by the defective eye, together, results in delivering to the person's brain information represented in such a way as to be readily recognized by the person as being substantially like that which would have normally reached the person's brain if that person was reading with normal vision. That is, this invention is believed to provide what might be thought of as a kind of "inverse transformation" so that the overall effect of this apparatus and the defective eye would, despite the eye's defect, provide to the user information represented in such a way as to provide to the user a subjective sense relatively close to that of normal reading.

ALTERNATIVE SCANNING HEAD

An alternative construction 80 for the scanning head is shown in FIG. 5. An approximately frustro-conical tapered bundle 82 of tapered optical fibers forms a device for reducing the size of the characters to fit them into the end of the long bundle of fibers 11.

The reducer 82 is mounted in a support structure 84, which has three inclined holes 80 (for clarity, only two of which are shown). The structure 84 is threaded onto the threaded coupling 81 at the end of the cable sheath 13. The upper end of the reducer 82 is closely coupled to the lower end of the fiber bundle 11 at the junction 95. A sleeve 86 is fitted onto a matching recess in the mounting structure 84 and is secured in place by means of set-screw 87. Three self-focusing light bulbs 90 (two of which are shown in FIG. 5) are mounted in recesses in sleeve 86 which mate with the holes 80. The bulbs 90 shine light onto the outside of the reducer unit 82, which admits the light and transmits it onto the page 18.

Pins and sockets 92 are provided to make electrical connections of wires 94 to the light bulbs 90. The wires 94 extend up the cable 14 to a power source (not shown), such as a battery or conventional household a.c. supply.

The flat lower surface 83 of the fiber-optic reducer 82, and the lower edge of the sleeve 86, combine to make a large, flat surface, small enough for convenient use, and large enough so as to be relatively easy to keep flush with the page 18 being read. The use of the reducer instead of a lens makes the scanning unit especially compact and easy to fabricate.

The number of lamps can be varied as desired. Three seems to be a satisfactory number, with the lamps being spaced apart at about 120° intervals about the vertical axis of the scanning head as shown in FIG. 5.

Figure 6:
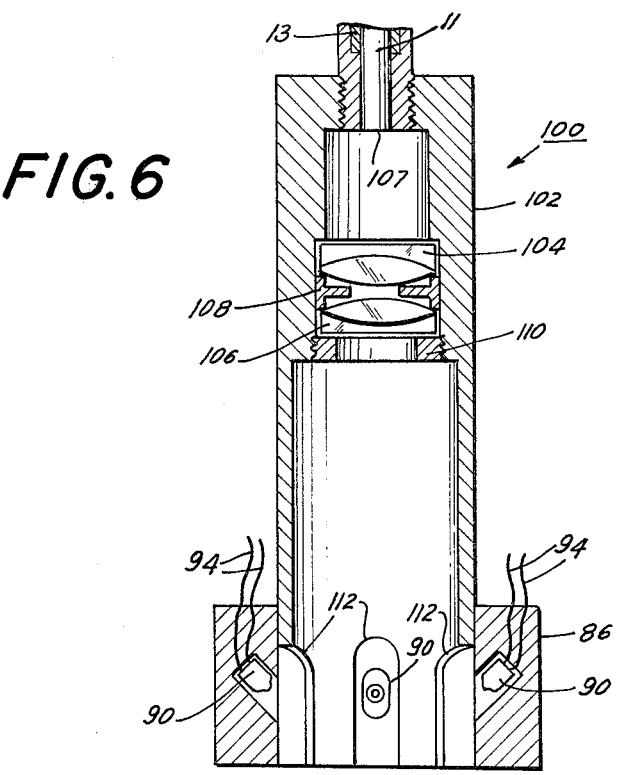

Another scanning head 100 is shown in FIG. 6. A housing 102 contains a pair of achromats 104 and 106 which are used to reduce (or magnify) and focus the character images on the end 107 of the fiber bundle 11. The housing 102 has three holes 112 spaced at 120° intervals (the front two holes are shown rotated to a position in which they are 180° apart, for the sake of clarity in the drawings).

A sleeve 86 like the one shown in FIG. 5 contains one bulb 90 for each hole 112 to illuminate the text being read.

The lenses 104 and 106 are held in place by a threaded retainer ring 110, and another ring 108 forms an aperture for the lenses.

The use of the two achromats for lenses 104 and 106 is one example of possible lens choice to provide a relatively well-corrected, relatively high-contrast image.

The aperture of the lens system 104, 106 (and also that of the lens 24 shown in FIG. 3) is made small relative to the distance of the lens system from the page to be read, so that the depth of field of the system is such that the reading head 100 (and 12 shown in FIG. 3) may be tilted slightly or held slightly away from the page 18 without seriously degrading the images. This makes the scanning considerably easier than it would be if the depth of field were not so great.

The device is simple, relatively uncomplicated, and relatively inexpensive to manufacture. It is believed that this device allows many victims of macular degeneration or other vision defects to read. Therefore, the device meets the objectives set forth at the beginning of this specification.

The above description of the invention is intended to be illustrative and not limiting. Various changes or modifications in the embodiments described may occur to those skilled in the art and these can be made without departing from the spirit or scope of the invention.

What is claimed is:

1. A device for aiding in the reading of written matter, said device comprising, in combination, a microscope and flexible light conduit means for transmitting to the object plane of said miscroscope images to be viewed by the person using said device. said microscope producing a substantial magnification and having an eyepiece consisting of a wide-angle lens, said magnification and angle of said wide-angle lens being sufficient to project said images over an area of the human retina substantially greater than the area of the macula lutea.

2. A device as in claim 1 in which said light conduit means is a fiber-optic bundle.

3. A device in claim 1 in which said microscope includes an objective lens, and means for holding one end of said flexible light conduit means securely at the object plane of said objective lens.

4. A device as in claim 1 in which said microscope includes eyepiece and objective lenses, and a diffuser between said eyepiece and objective lenses.

5. A device as in claim 4 in which said diffuser is a lenticular screen.

6. A device as in claim 1 including a scanning device on one end of said conduit means for scanning written matter on sheet material, said device having focusing means for focusing images onto the said one end.

7. A device as in claim 1 in which said magnification is in the approximate range of 30 to 300, and said angle is over sixty degrees.

8. A device as in claim 6 in which said focusing means includes reducing means for reducing the size of images to be transmitted to said conduit means.

9. A device as in claim 1 including a bundle of tapered optical fibers coupled to one end of said conduit means.

10. A device as in claim 1 including lamp means positioned adjacent one end of said conduit means to illuminate the matter being viewed.

11. A vision aid device comprising, in combination, dividing means including a fiber-optic bundle for dividing images to be seen into relatively small segments, in each of which segments the light is averaged over the cross-sectional area of the segment, means for magnifying an array of said segments forming said image, and projecting means comprising a wide-angle lens for projecting said array onto a substantial portion of the operative section of the user's retina outside of the macula lutea.

12. A device as in claim 1 or claim 11 including scanning means for scanning graphic material to be viewed, said scanning means including focusing means having a relatively great depth of field so as to reduce the precision required for the location of said focusing means relative to said graphic material.

* * * * *